US012300418B2

(12) United States Patent
Choi et al.

(10) Patent No.: US 12,300,418 B2
(45) Date of Patent: May 13, 2025

(54) MAGNETIC COUPLING DEVICE AND FLAT PANEL DISPLAY DEVICE INCLUDING THE SAME

(71) Applicant: LG INNOTEK CO., LTD., Seoul (KR)

(72) Inventors: Jung Hwan Choi, Seoul (KR); In Seong Sohn, Seoul (KR); So Yeon Kim, Seoul (KR)

(73) Assignee: LG INNOTEK CO, LTD., Seoul (KR)

( * ) Notice: Subject to any disclaimer, the term of this patent is extended or adjusted under 35 U.S.C. 154(b) by 695 days.

(21) Appl. No.: 17/017,978

(22) Filed: Sep. 11, 2020

(65) Prior Publication Data

US 2021/0104352 A1 Apr. 8, 2021

(30) Foreign Application Priority Data

Oct. 4, 2019 (KR) ........................ 10-2019-0123108
Jul. 14, 2020 (KR) ........................ 10-2020-0086990

(51) Int. Cl.
*H01F 5/00* (2006.01)
*H01F 27/255* (2006.01)
*H01F 27/28* (2006.01)
*H01F 27/32* (2006.01)

(52) U.S. Cl.
CPC ....... *H01F 27/2823* (2013.01); *H01F 27/255* (2013.01); *H01F 27/324* (2013.01)

(58) Field of Classification Search
CPC .................................................. H01F 27/2823
USPC .......................................................... 336/200
See application file for complete search history.

(56) References Cited

U.S. PATENT DOCUMENTS 8,471,666 B2 * 6/2013 Kaneko ................. H01F 27/306 336/198
9,824,810 B2 * 11/2017 Eom ....................... H01F 27/24
2006/0214759 A1 * 9/2006 Kawarai ............. H01F 17/0006 336/200
2010/0079229 A1 * 4/2010 Koprivnak ............. H01F 27/29 336/200
2011/0241816 A1 * 10/2011 Park ........................ H01F 41/34 336/200

(Continued)

FOREIGN PATENT DOCUMENTS

CN 108682543 10/2018
DE 3700488 7/1988

(Continued)

OTHER PUBLICATIONS

English translation of JPH056816 (Year: 1993).*

(Continued)

*Primary Examiner* — Ronald Hinson
(74) *Attorney, Agent, or Firm* — KED & ASSOCIATES, LLP

(57) ABSTRACT

A magnetic coupling device is disclosed. The magnetic coupling device includes a core portion including an upper core and a lower core spaced apart from each other in a first direction, a primary coil and a secondary coil disposed between the upper core and the lower core in the state of being spaced apart from each other in the first direction, and a core connector electrically connected to the upper core and the lower core. A discharge phenomenon of a slim magnetic coupling device is prevented by the provision of the core connector.

17 Claims, 7 Drawing Sheets

(56) References Cited

U.S. PATENT DOCUMENTS

| | | | | |
|---|---|---|---|---|
| 2013/0207767 | A1* | 8/2013 | Worthington | H01F 27/363 336/84 C |
| 2014/0266546 | A1* | 9/2014 | Mao | H01F 41/046 336/200 |
| 2015/0061805 | A1 | 3/2015 | Eom et al. | |
| 2017/0092413 | A1* | 3/2017 | Matsunaga | H01F 27/2804 |

FOREIGN PATENT DOCUMENTS

| | | |
|---|---|---|
| DE | 19500943 | 5/1996 |
| JP | S63-228604 | 9/1988 |
| JP | H05-121248 | 5/1993 |
| JP | 2012-089765 | 5/2012 |
| JP | 2013-175657 | 9/2013 |
| JP | 2016-015453 | 1/2016 |
| KR | 10-2002-0045521 | 6/2002 |
| KR | 10-2012-0030883 | 3/2012 |
| KR | 10-2012-0076299 | 7/2012 |
| KR | 10-1171704 | 8/2012 |
| KR | 10-2013-0116042 | 10/2013 |
| KR | 20-2013-0007176 | 12/2013 |
| KR | 10-2015-0072739 | 6/2015 |
| KR | 10-2444844 | 9/2022 |

OTHER PUBLICATIONS

English translation of CN203444946 (Year: 2014).*
Korean Office Action dated Oct. 21, 2021 issued in KR Application No. 10-2021-0136452.
European Search Report dated Feb. 26, 2021 issued in Application No. 20199629.5.
Korean Office Action dated Oct. 8, 2022 issued in Application No. 10-2022-0115662.
Japanese Office Action dated Oct. 22, 2024, issued in Application No. 2020-165377.

* cited by examiner

MAGNETIC COUPLING DEVICE AND FLAT PANEL DISPLAY DEVICE INCLUDING THE SAME

CROSS REFERENCE TO RELATED APPLICATION

This application claims priority under 35 U.S.C. § 119 to Korean Patent Application Nos. 10-2019-0123108, filed Oct. 4, 2019 and 10-2020-0086990, filed Jul. 14, 2020, which are hereby incorporated in their entireties by references as if fully set forth herein.

TECHNICAL FIELD

Embodiments relate to a magnetic coupling device and a flat panel display device including the same.

BACKGROUND

In general, driving power is required in order to drive an electronic device, and a power supply device, such as a power supply unit (PSU), is essentially adopted in order to supply driving power to the electronic device.

In particular, slimming of a display device, such as a flat panel TV, is required together with enlargement in size of the display device. Accordingly, it is necessary to reduce the thickness of the large display device while satisfying increasing power consumption thereof.

A transformer, which is a kind of magnetic coupling device, occupies a larger volume of the power supply unit (PSU) than other elements. For slimming, therefore, a method of omitting large-thickness elements from the transformer or adjusting the number thereof is generally considered. For example, in recent years, a bobbin, around which a primary coil and a secondary coil are wound in the state of being fixed thereto, has been omitted from a transformer constituting a power supply unit of a flat panel display device, or a plurality of low-capacity slim transformers has been adopted.

In the case in which the number of transformers is increased, however, the area of the transformer in the power supply unit excessively increases. Also, in the case in which the bobbin is omitted, it is difficult to secure the insulation distance between the primary coil and the secondary coil, whereby parasitic capacitance is generated between the coils. The parasitic capacitance between the coils may cause undesirable fluctuation of an operating frequency of a device to which the transformer is coupled. For this reason, it is necessary to maximally inhibit parasitic capacitance. In addition, a discharge (arc) phenomenon may occur due to potential difference between the primary coil and the secondary coil or potential difference caused by the spacing distance between cores, and the discharge phenomenon causes damage to parts.

Therefore, there is a necessity for a magnetic coupling device capable of preventing a discharge phenomenon and reducing parasitic capacitance in a situation in which it is difficult to secure the insulation distance between the primary coil and the secondary coil as the result of a decrease in thickness of the cores and a flat panel display device including the same.

SUMMARY

Embodiments provide a slim magnetic coupling device capable of preventing a discharge phenomenon and a flat panel display device including the same.

Objects of embodiments are not limited to the aforementioned objects, and other unmentioned objects will be clearly understood by those skilled in the art based on the following description.

In one embodiment, a magnetic coupling device includes a core portion including an upper core and a lower core spaced apart from each other in a first direction, a primary coil and a secondary coil disposed between the upper core and the lower core in the state of being spaced apart from each other in the first direction, and a core connector electrically connected to the upper core and the lower core, wherein the spacing distance between the primary coil and the secondary coil in the first direction is 0.025 or less times of the sum of the thickness of the upper core in the first direction and the thickness of the lower core in the first direction, and the core connector contacts the outer side surface of the upper core and the outer side surface of the lower core.

The upper core may include a plurality of first protrusions protruding in the first direction, and the lower core may include a plurality of second protrusions protruding in the first direction.

The plurality of first protrusions and the plurality of second protrusions may be opposite each other.

Each of the plurality of first protrusions may extend in a second direction, the second direction being perpendicular to the first direction, and each of the plurality of second protrusions may extend in the second direction.

The plurality of first protrusions may include two first outer legs disposed so as to be spaced apart from each other in a third direction and a first central leg disposed between the two first outer legs, and the plurality of second protrusions may include two second outer legs disposed so as to be spaced apart from each other in the third direction and a second central leg disposed between the two second outer legs, the third direction being perpendicular to the first direction and the second direction.

The width of each of the first outer legs in the third direction may be less than the width of the first central leg in the third direction.

The spacing distance between the primary coil and the secondary coil in the first direction may be 0.004 or more times of the sum of the thickness of the upper core in the first direction and the thickness of the lower core in the first direction.

The core portion may include a first side surface, a second side surface, a third side surface, and a fourth side surface, the first side surface and the second side surface being opposite each other, the third side surface and the fourth side surface being perpendicular to the first side surface, the third side surface and the fourth side surface being opposite each other, and each of the primary coil and the secondary coil may be disposed between the third side surface and the fourth side surface so as to extend outside the core portion.

The core connector may extend from the upper core to the lower core on the third side surface.

The area of the core connector may be ¼ to ½ times of the area of the third side surface.

The magnetic coupling device may further include an insulating film configured to wrap the core connector, wherein the insulating film may couple the core connector, the upper core, and the lower core to each other.

The core connector may not extend to the upper surface of the upper core and the lower surface of the lower core.

The core connector may include copper (Cu), the primary coil may include a conductive wire wound in the circumferential direction a plurality of times, and the secondary coil may include a printed circuit board.

In another embodiment, a magnetic coupling device includes a core portion including an upper core and a lower core spaced apart from each other in a first direction, a primary coil and a secondary coil disposed between the upper core and the lower core in the state of being spaced apart from each other in the first direction, an insulating member disposed between the primary coil and the secondary coil, and a core connector electrically connected to the upper core and the lower core, wherein the distance of the insulating member in the first direction is 0.004 to 0.025 times of the sum of the thickness of the upper core in the first direction and the thickness of the lower core in the first direction.

The insulating member may include a lower primary insulating layer disposed at the lower surface of the primary coil and an upper secondary insulating layer disposed at the upper surface of the secondary coil.

The upper core may include a first upper surface and a first lower surface, a 1-1 side surface and a 1-2 side surface disposed between the first upper surface and the first lower surface, the 1-1 side surface and the 1-2 side surface being opposite each other, and a plurality of first recesses formed in the first lower surface so as to be concave toward the first upper surface, the plurality of first recesses extending from the 1-1 side surface to the 1-2 side surface.

The lower core may include a second upper surface and a second lower surface, a 2-1 side surface and a 2-2 side surface disposed between the second upper surface and the second lower surface, the 2-1 side surface and the 2-2 side surface being opposite each other, and a plurality of second recesses formed in the second upper surface so as to be concave toward the second lower surface, the plurality of second recesses extending from the 2-1 side surface to the 2-2 side surface.

The upper core may include a 1-3 side surface and a 1-4 side surface, the 1-3 side surface and the 1-4 side surface being perpendicular to the 1-1 side surface and the 1-2 side surface, the 1-3 side surface and the 1-4 side surface being opposite each other, the lower core may include a 2-3 side surface and a 2-4 side surface, the 2-3 side surface and the 2-4 side surface being perpendicular to the 2-1 side surface and the 2-2 side surface, the 2-3 side surface and the 2-4 side surface being opposite each other, the 1-3 side surface and the 2-3 side surface may be oriented in the same direction, and the core connector may extend from the 1-3 side surface to the 2-3 side surface.

The area of the core connector may be ¼ to ½ times of the sum of the area of the 1-3 side surface and the area of the 2-3 side surface.

The first lower surface may include a 1-1 lower surface, a 1-2 lower surface, and a 1-3 lower surface divided by the plurality of first recesses, the 1-3 lower surface being located between the 1-1 lower surface and the 1-2 lower surface, the lengths of the 1-1 lower surface, the 1-2 lower surface, and the 1-3 lower surface in a second direction from the 1-1 side surface to the 1-2 side surface may be equal to each other, and the width of the 1-3 lower surface in a third direction from the 1-1 lower surface to the 1-2 lower surface may be greater than the width of the 1-1 lower surface in the third direction.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Figure 1:
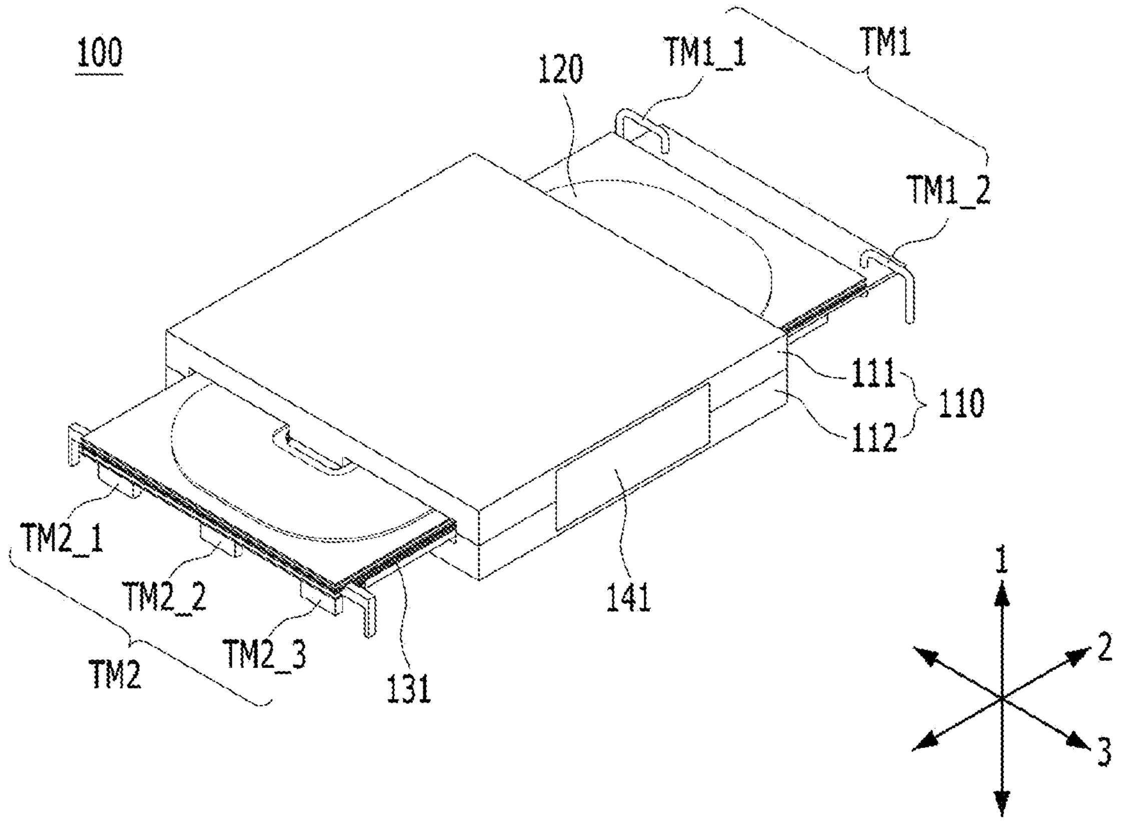
FIG. 1 is a perspective view of a transformer according to an embodiment.

The present disclosure may be changed in various manners and may have various embodiments, wherein specific embodiments will be described with reference to the drawings. However, the present disclosure is not limited to the specific embodiments, and it should be understood that the present disclosure includes all modifications, equivalents, or substitutions included in the idea and technical scope of the present disclosure.

Although terms including ordinal numbers, such as "first" and "second," may be used herein to describe various components, these components should not be limited by these terms. These terms are only used to distinguish one component from another component. For example, a first element could be termed a second element, and, similarly, a second element could be termed a first element, without departing from the scope of the present disclosure. The term "and/or" includes any and all combinations of one or more of the associated listed items.

It should be understood that, when a component is referred to as being "connected to" or "coupled to" another component, it may be directly connected to or coupled to another component or intervening components may be present. In contrast, it should be understood that, when a component is referred to as being "directly connected to" or "directly coupled to" another component, there are no intervening components present.

In the following description of the embodiments, it will be understood that, when an element, such as a layer (film), a region, a pattern, or a structure is referred to as being "on" or "under" another element, such as a substrate, a layer (film), a region, a pad, or a pattern, it can be "directly" on or under another element or can be "indirectly" formed such that an intervening element is also present. Terms such as "on" or "under" will be described on the basis of the drawings. Also, in the drawings, the thickness or size of a layer (film), a region, a pattern, or a structure may be changed for convenience of description and clarity, and therefore the size thereof does not entirely reflect the actual size thereof.

The terms used in the present application are provided only to described specific embodiments, and do not limit the present disclosure. Singular forms are intended to include plural forms as well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

Hereinafter, a magnetic coupling device according to embodiments will be described with reference to the accompanying drawings. Hereinafter, it will be assumed that the magnetic coupling device is a transformer for convenience of description; which, however, is illustrative and thus embodiments are not limited thereto. For example, the magnetic coupling device according to embodiments may include a magnetic element, such as an inductor, in addition to the transformer.

Figure 2A:
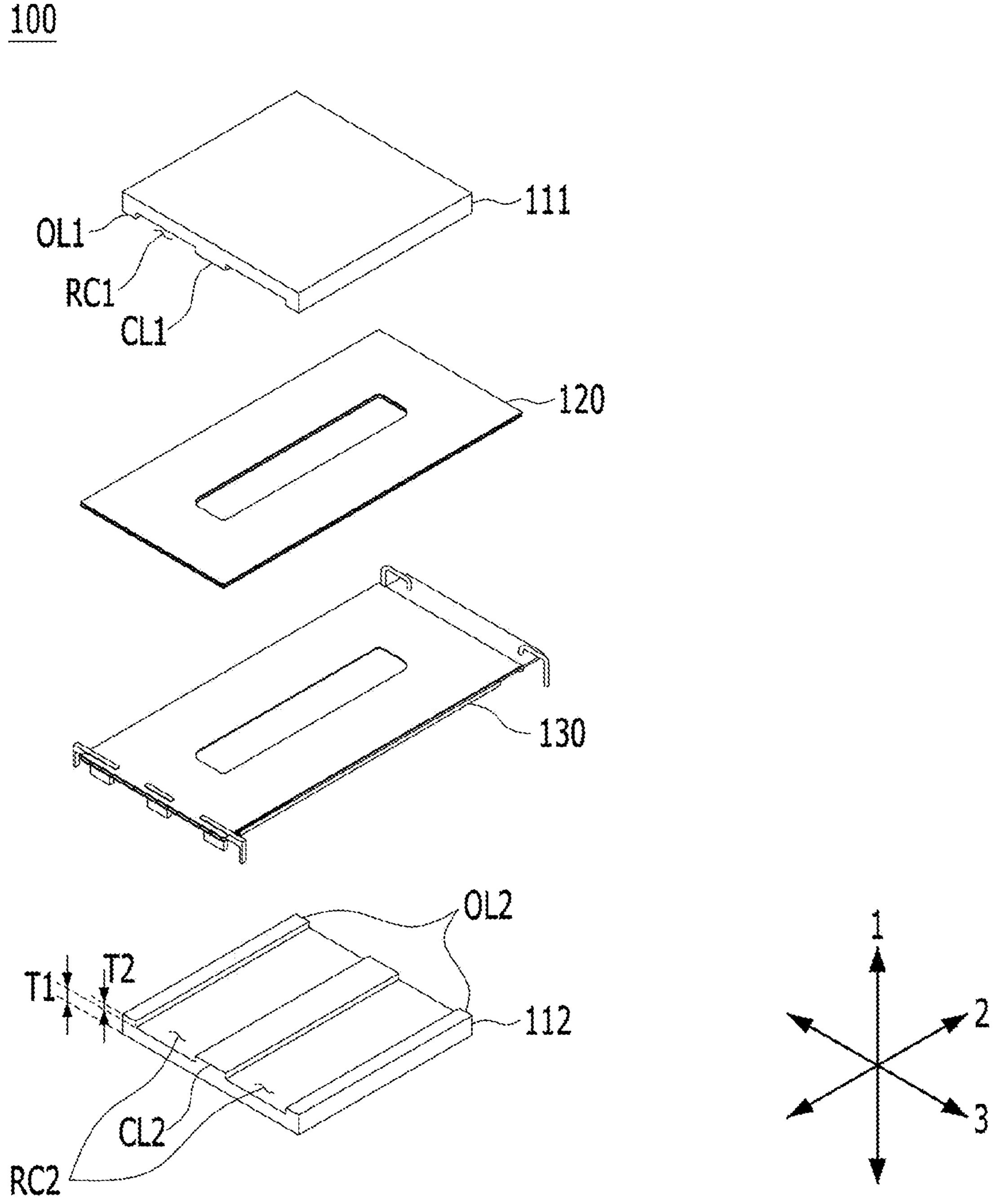
FIGS. 2A and 2B are exploded perspective views of the transformer according to the embodiment.
Figure 2B:
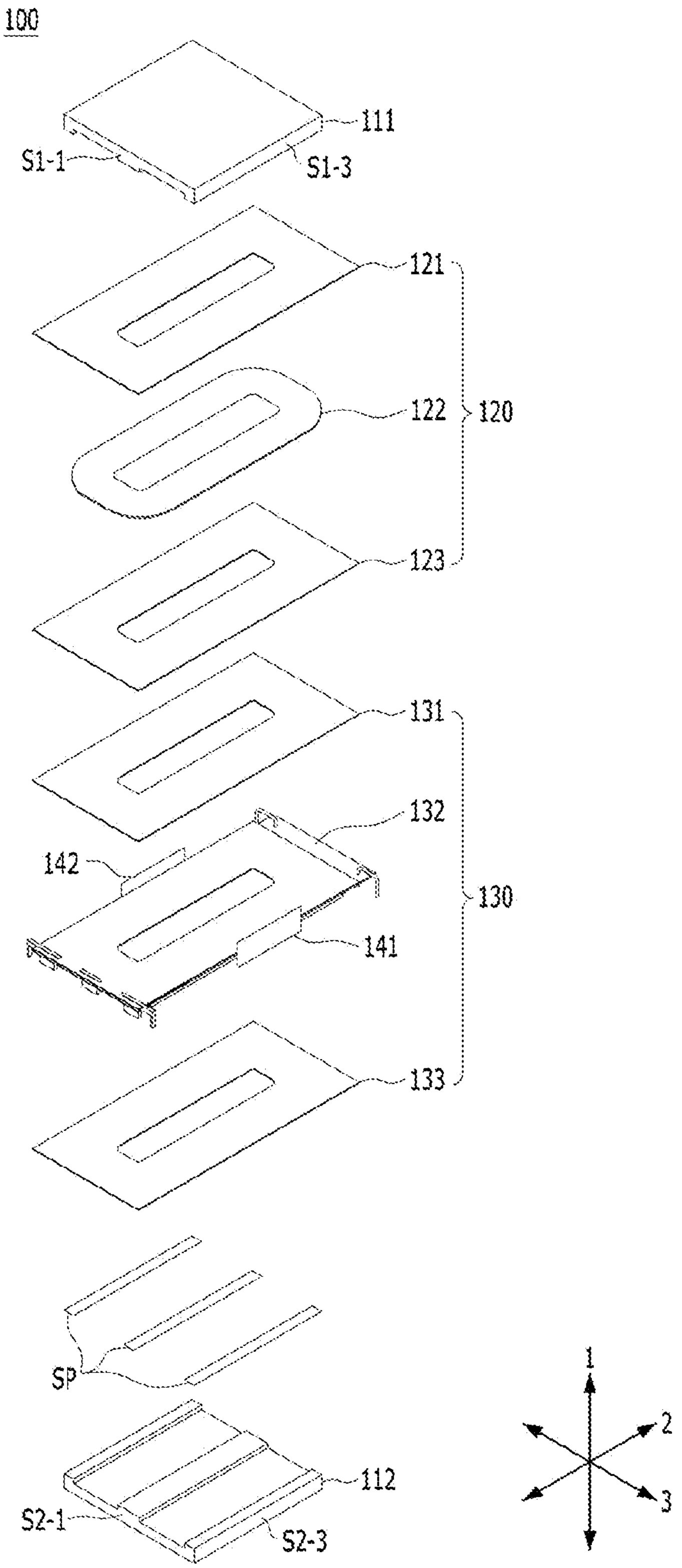

FIG. 1 is a perspective view of a transformer according to an embodiment, and FIGS. 2A and 2B are exploded perspective views of the transformer according to the embodiment.

Referring to FIGS. 1 to 2B together, the transformer 100 according to the embodiment may include a core portion 110, a primary side coil portion 120, a secondary side coil portion 130, core connectors 141 and 142, and terminal units TM1 and TM2. Hereinafter, the above elements will be described in detail.

The core portion 110 may have the nature of a magnetic circuit and thus may serve as a magnetic flux path. The core portion may include an upper core 111 located at the upper side and a lower core 112 located at the lower side. The cores 111 and 112 may have vertically symmetric shapes or asymmetric shapes. The core portion 110 may include a magnetic material, such as iron or ferrite. However, embodiments are not limited thereto. Each of the upper core 111 and the lower core 112 is an "E" type core having a plurality of protrusions protruding from a flat body in a first direction (i.e. a first-axis direction), as is generally known. For example, the upper core 111 may include a plurality of first protrusions OL1 and CL1 protruding in the first direction, and the lower core 112 may include a plurality of second protrusions OL2 and CL2 protruding in the first direction. Here, the plurality of first protrusions OL1 and CL1 and the plurality of second protrusions OL2 and CL2 may be opposite each other. Each of the plurality of first protrusions OL1 and CL1 and the plurality of second protrusions OL2 and CL2 may extend in a second direction (i.e. a second-axis direction), which intersects (e.g. is perpendicular to) the first direction.

The plurality of first protrusions OL1 and CL1 may include two first outer legs OL1 spaced apart from each other in a third direction (i.e. a third-axis direction), which intersects (e.g. is perpendicular to) the first direction and the second direction, and a first central leg CL1 disposed between the two first outer legs OL1. In addition, the plurality of second protrusions OL2 and CL2 may include two second outer legs OL2 spaced apart from each other in the third direction and a second central leg CL2 disposed between the two second outer legs OL2. Here, the width of each of the two first outer legs OL1 in the third direction may be less than the width of the first central leg CL1 in the third direction.

The upper core 111 may include a first upper surface, which corresponds to an upper surface of the core portion 110, a first lower surface, which corresponds to a lower surface of the core portion 110, a 1-1 side surface S1-1, a 1-2 side surface, which is opposite the 1-1 side surface S1-1, a 1-3 side surface S1-3, which is perpendicular to the 1-1 side surface S1-1 and the 1-2 side surface, and a 1-4 side surface, which is opposite the 1-3 side surface S1-3.

In addition, the lower core 112 may include a second upper surface, which corresponds to the upper surface of the core portion 110, a second lower surface, which corresponds to the lower surface of the core portion 110, a 2-1 side surface S2-1, a 2-2 side surface, which is opposite the 2-1 side surface S2-1, a 2-3 side surface S2-3, which is perpendicular to the 2-1 side surface S2-1 and the 2-2 side surface, and a 2-4 side surface, which is opposite the 2-3 side surface S2-3.

The 1-1 side surface S1-1 and the 2-1 side surface S2-1, which are oriented in the same direction, correspond to a first side surface of the core portion 110, and the 1-2 side surface and the 2-2 side surface correspond to a second side surface of the core portion 110. In addition, the 1-3 side surface S1-3 and the 2-3 side surface S2-3, which are oriented in the same direction, correspond to a third side surface of the core portion 110, and the 1-4 side surface and the 2-4 side surface correspond to a fourth side surface of the core portion 110.

The upper core 111 may include a plurality of first recesses RC1 formed in the first lower surface so as to be concave toward the first upper surface, and the plurality of first recesses RC1 may extend from the 1-1 side surface S1-1 to the 1-2 side surface.

In addition, the lower core 112 may include a plurality of second recesses RC2 formed in the second upper surface so as to be concave toward the second lower surface, and the plurality of second recesses RC2 may extend from the 2-1 side surface S2-1 to the 2-2 side surface.

Each of the plurality of first recesses RC1 and the plurality of second recesses RC2 defines two through-holes, and the two through-holes may function as reception holes configured to receive a portion of the primary side coil portion 120 and a portion of the secondary side coil portion 130.

Meanwhile, the plurality of first recesses RC1 divides the first lower surface of the upper core 111 into a 1-1 lower surface, a 1-2 lower surface, and a 1-3 lower surface, which is located between the 1-1 lower surface and the 1-2 lower surface. Here, each of the 1-1 lower surface, the 1-2 lower surface, and the 1-3 lower surface may correspond to the lower surface of each of the plurality of first recesses RC1. The lengths of the 1-1 lower surface, the 1-2 lower surface, and the 1-3 lower surface in the second direction may be equal to each other, and the width of the 1-3 lower surface in the third direction may be greater than the width of the 1-1 lower surface in the third direction.

The upper core 111 and the lower core 112 are coupled to each other in the form in which the outer legs OL1 and OL2 are opposite each other and the central legs CL1 and CL2 are opposite each other in the state in which spacers SP are located between the opposite outer legs and between the opposite central legs, i.e. the gap therebetween. Each of the spacers SP may include an insulating material having a predetermined thickness or a thermally conductive material capable of easily performing heat transfer and thus transferring heat inside the core portion to the outside.

The gap, i.e. the distance between the upper core 111 and the lower core 112 in the first direction, may be 100 μm to 200 μm. In the case in which the gap is less than 100 μm, it is difficult to effectively discharge heat generated in the core portion 110 to the outside. In the case in which the gap is greater than 200 μm, the force of coupling between the upper core 111 and the lower core 112 and/or the force of coupling between the primary side coil portion 120 and the secondary side coil portion 130 may decrease.

Inductance of the core portion 110 may be controlled as the gap between the opposite central legs and between the opposite outer legs is adjusted, and the total amount of heat that is generated from the transformer 100 may decrease as heat inside the core portion is discharged to the outside. The first-direction thickness T1+T2 of each of the upper core 111 and the lower core 112 may be 4 mm to 5 mm, preferably 4.6 mm to 4.8 mm. The first-direction thickness T1+T2 of each of the upper core 111 and the lower core 112 may define the total thickness of the transformer, and it is possible to achieve slimming of a transformer that satisfies magnetic coupling characteristics only within the above thickness range. Since this thickness range is a value based on the present technical limitation of the magnetic coupling device for slimming, however, the above thickness may be decreased or may be increased in order to satisfy greater magnetic coupling characteristics.

The ratio of the distance between the upper core 111 and the lower core 112 in the first direction to the sum of the first-direction thickness of the upper core 111 and the first-direction thickness of the lower core 112 (i.e. 2*(T1+T2)) may be 0.01 to 0.025 or less. When this ratio is satisfied, it is possible to provide a structure capable of easily discharging heat generated in the core portion 110 out of the core portion while securing the force of coupling between the primary side coil portion 120 and the secondary side coil portion 130 and to achieve slimming of the magnetic coupling device.

The primary side coil portion 120 may include a primary coil 122 and an upper primary insulating layer 121 and a lower primary insulating layer 123 disposed respectively at the upper part and the lower part of the primary coil 122. In particular, the upper primary insulating layer 121 may contribute to insulation between the upper core 111 and the primary coil 122, and the lower primary insulating layer 123 may contribute to insulation between the upper core 111 and the secondary side coil portion 130. The upper primary insulating layer 121 and the lower primary insulating layer 123 may be made of the same material or may be made of different materials. The upper primary insulating layer 121 and the lower primary insulating layer 123 may be integrally formed so as to wrap not only the upper surface and the lower surface but also the side surface of the primary coil 122 in order to shield the primary coil 122, or the planar area of each of the upper primary insulating layer 121 and the lower primary insulating layer 123 may be formed so as to be greater than the planar area of the primary coil 122 such that the upper primary insulating layer 121 and the lower primary insulating layer 123 are coupled to each other outside the primary coil 122. Consequently, it is possible to secure insulation characteristics between the primary coil 122 and the core portion 110 and insulation characteristics between the primary coil 122 and the secondary side coil portion 130.

The thickness of each of the upper primary insulating layer 121 and the lower primary insulating layer 123 may be 50 μm to 75 μm. In the case in which the thickness is less than 50 μm, it is difficult to secure insulation characteristics. In the case in which the thickness is greater than 75 μm, the effect of discharging heat through the gap between the upper core 111 and the lower core 112 may be lowered. Here, the sum of the thickness of the primary side coil portion 120 and the thickness of the secondary side coil portion 130 must be less than the first-direction thickness of each of the reception holes configured to receive the coil portions 120 and 130 (i.e. the two through-holes extending in the second direction) such that the primary side coil portion 120 and the secondary side coil portion 130 are received in the reception holes when the upper core 111 and the lower core 112 are coupled to each other. Here, on the assumption that the upper core 111 and the lower core 112 are symmetrical in shape and the heights T2 of the central leg and the outer legs of each core are equal to each other, the height of each of the reception holes may correspond to the sum of the first-direction thickness T2 of each of the central leg and the outer legs of the upper core 111, the first-direction thickness T2 of each of the central leg and the outer legs of the lower core 112, and the first-direction thickness of each of the spacers SP (i.e. 2*T2+thickness of SP).

As long as the coil portions are received in the reception holes while the heat dissipation effect is achieved, however, the thicknesses of the upper primary insulating layer 121 and the lower primary insulating layer 123 may be less than 50 μm or may be greater than 75 μm.

The primary coil 122 may be a multiple winding formed by winding a rigid metal conductor, such as a copper conductive wire, a plurality of times in a planar spiral form in the circumferential direction. However, embodiments are not limited thereto. For example, the primary coil 122 may be a metal plate etched so as to form a plurality of turns or may be formed in the shape of a board on which such a metal plate is printed.

Each of the upper primary insulating layer 121 and the lower primary insulating layer 123 may have a thin film shape having a predetermined thickness, and may include a highly insulative component, such as a ketone or polyimide. However, embodiments are not limited thereto. For example, each of the upper primary insulating layer 121 and the lower primary insulating layer 123 may be formed in the shape of an insulative coating film.

The secondary side coil portion 130 may include a secondary coil 132 and an upper secondary insulating layer 131 and a lower secondary insulating layer 133 disposed respectively at the upper part and the lower part of the secondary coil 132. In particular, the upper secondary insulating layer 131 may contribute to insulation between the primary side coil portion 120 and the secondary coil 132, and the lower secondary insulating layer 133 may contribute to insulation between the secondary coil 132 and the lower core 112.

The secondary coil 132 may include a conductive plate forming a single turn, and a plurality of conductive plates, e.g. two or more conductive plates, may be provided. For example, the secondary coil 132 may be formed in the shape of a printed circuit board (PCB) having conductive plates disposed on opposite surfaces thereof or printed circuit boards, each of which has a conductive plate disposed on one surface thereof, stacked in the first direction (i.e. the first-axis direction). However, embodiments are not limited thereto. In the case in which a printed circuit board (PCB) having conductive plates disposed on opposite surfaces thereof is used, the conductive plates disposed on the respective surfaces may have planar shapes that are horizontally symmetrical to each other in the third direction (i.e. the third-axis direction). However, embodiments are not limited thereto.

The upper secondary insulating layer 131 and the lower secondary insulating layer 133 may be made of the same material as the upper primary insulating layer 121 and the lower primary insulating layer 123. However, embodiments are not limited thereto. In addition, the thicknesses of the upper secondary insulating layer 131 and the lower secondary insulating layer 133 may be 50 μm to 60 μm, similarly to the upper primary insulating layer 121 and the lower primary insulating layer 123. However, embodiments are not limited thereto.

Meanwhile, the insulation distance between the primary coil 122 and the secondary coil 132 in the first direction may be the spacing distance between the primary coil 122 and the secondary coil 132, and an insulating member may be disposed within the spacing distance. Also, in the case in which the thickness of the insulating member is equal to the spacing distance, the spacing distance may correspond to the thickness of the insulating member in the first direction. Here, the insulating member between the primary coil 122 and the secondary coil 132 may be the lower primary insulating layer 123 and the upper secondary insulating layer 131. The insulation distance affects parasitic capacitance between the primary coil 122 and the secondary coil 132.

Preferably, the ratio of the sum of the lower primary insulating layer 123 and the upper secondary insulating layer 131 to the sum of the thickness of the upper core 111 and the thickness of the lower core 112 (e.g. 2*(T1+T2)) may be 0.004 to 0.025. More preferably, the ratio may be 0.01 to 0.015. It is possible to manufacture a slim magnetic coupling device while preventing electrical short circuit or current leakage between the primary coil 122 and the secondary coil 132 within the above ratio.

The primary side coil portion 120 and the secondary side coil portion 130 may be aligned with each other based on the central leg of the core portion 110 in the first direction (i.e. the first-axis direction). To this end, each of the primary side coil portion 120 and the secondary side coil portion 130 may have a hollow hole corresponding to the planar shape of the central leg of the core portion 110 such that the central leg is disposed in the hollow hole.

Each of the primary coil 122 and the secondary coil 132 may be disposed between the third side surface and the fourth side surface of the core portion 110 so as to extend outside the core portion 110.

The core connectors 141 and 142 may be disposed at the outer side surface of the upper core 111 and the outer side surface of the lower core 112 so as to physically couple or electrically connect the upper core 111 and the lower core 112 to each other. For example, the upper core 111 and the lower core 112 may be electrically short-circuited to each other via the core connectors 141 and 142. For short circuit, at least a portion of each of the core connectors 141 and 142 may be brought into contact with (i.e. be electrically connected to) the upper core 111, and at least a portion of the remaining part of each of the core connectors 141 and 142 may be brought into contact with the lower core 112.

That is, each of the core connectors 141 and 142 may be disposed so as to extend from the side surface of the upper core 111 to the side surface of the lower core 112. For example, each of the core connectors 141 and 142 may be disposed such that at least one of the first to fourth side surfaces of the upper core 111 and at least one of the first to fourth side surfaces of the lower core 112 are electrically connected to each other. More specifically, the core connector 141 may extend from the 1-3 side surface S1-3 to the 2-3 side surface S2-3. That is, the core connector 141 may extend from the upper core 111 to the lower core 112 on the third side surface.

In order to prevent an increase in the total thickness of the magnetic coupling device, each of the core connectors 141 and 142 may not extend to the upper surface of the upper core 111 and/or the lower surface of the lower core 112. To this end, the area of each of the core connectors 141 and 142 may be ¼ to ½ times of the sum of the area of the 1-3 side surface S1-3 of the upper core 111 and the area of the 2-3 side surface S2-3 of the lower core 112 (i.e. the area of the third side surface). However, the above area ratio is illustrative. Embodiments are not limited thereto as long as it is possible to secure the force of coupling between the upper core 111 and the lower core 112, to reduce parasitic capacitance, and to prevent a discharge phenomenon.

Preferably, the height of the core connectors 141 and 142 in the first direction may be lower than the sum of the thicknesses of the upper core 111 and the lower core 112.

In addition, each of the core connectors 141 and 142 may include a conductive material for short circuit between the upper core 111 and the lower core 112, and may have a thin film shape for slimming of the entirety of the transformer. However, embodiments are not limited thereto. As an example, each of the core connectors 141 and 142 may be a copper foil or a wire having a circular or polygonal sectional shape. As another example, each of the core connectors 141 and 142 may be a copper foil having a polygonal or circular planar shape, rather than a quadrangular planar shape.

FIGS. 1 to 2B show that the core connectors 141 and 142 are disposed at opposite side surfaces of the core portion 110 while each having a quadrangular planar shape, which, however, is illustrative. The shape and position of the core connectors 141 and 142 are not particularly restricted as long as the core connectors are capable of electrically connecting the upper core 111 and the lower core 112 to each other. As an example, one of the core connectors 141 and 142 may be omitted. As another example, the core connectors 141 and 142 may be replaced with at least one of the spacers SP disposed between the opposite central legs and between the opposite outer legs of the core portion 110. In this case, each of the core connectors replaced with the spacers SP for short circuit between the upper core 111 and the lower core 112 may be made of an anisotropic conductive film (ACF) or a copper (Cu) foil.

The terminal units TM1 and TM2 may be coupled to the board of the secondary coil 132 constituting the secondary side coil portion 130, and may perform a function of fixing the transformer 100 to a board (not shown) of a power supply unit (PSU) and function as an electrical connection path between each of the coil portions 120 and 130 and the board (not shown) of the power supply unit (PSU).

More specifically, the terminal units TM1 and TM2 may include primary coil side terminals TM1_1 and TM1_2 and secondary coil side terminals TM2_1, TM2_2, and TM2_3. The primary coil side terminals TM1_1 and TM1_2 may be electrically connected to opposite ends of the wire constituting the primary coil 122. In addition, the secondary coil side terminals TM2_1, TM2_2, and TM2_3 may be connected to the conductive plates constituting the secondary coil 132. For example, the secondary coil side terminals TM2_1 and TM2_3 at opposite edges may correspond to signal terminals, and the secondary coil side terminal TM2_2 at the center may correspond to a ground terminal. In addition, the secondary coil side terminal TM2_2 at the center may electrically interconnect a plurality of metal plates connected to any one of the secondary coil side terminals TM2_1 and TM2_3 at the opposite edges, thereby realizing a so-called center tap structure.

Meanwhile, although not shown in FIGS. 1 to 2B, the transformer according to the embodiment may further include an insulating film configured to couple the core connectors 141 and 142, the upper core 111, and the lower core 112 to each other while wrapping the core connectors 141 and 142.

Hereinafter, the principle by which a discharge phenomenon occurs in a transformer 100' according to a comparative example will be described with reference to FIGS. 3A and 3B, and the effect of preventing a discharge phenomenon in the transformer according to the embodiment will be described with reference to FIG. 4.

Figure 3A:
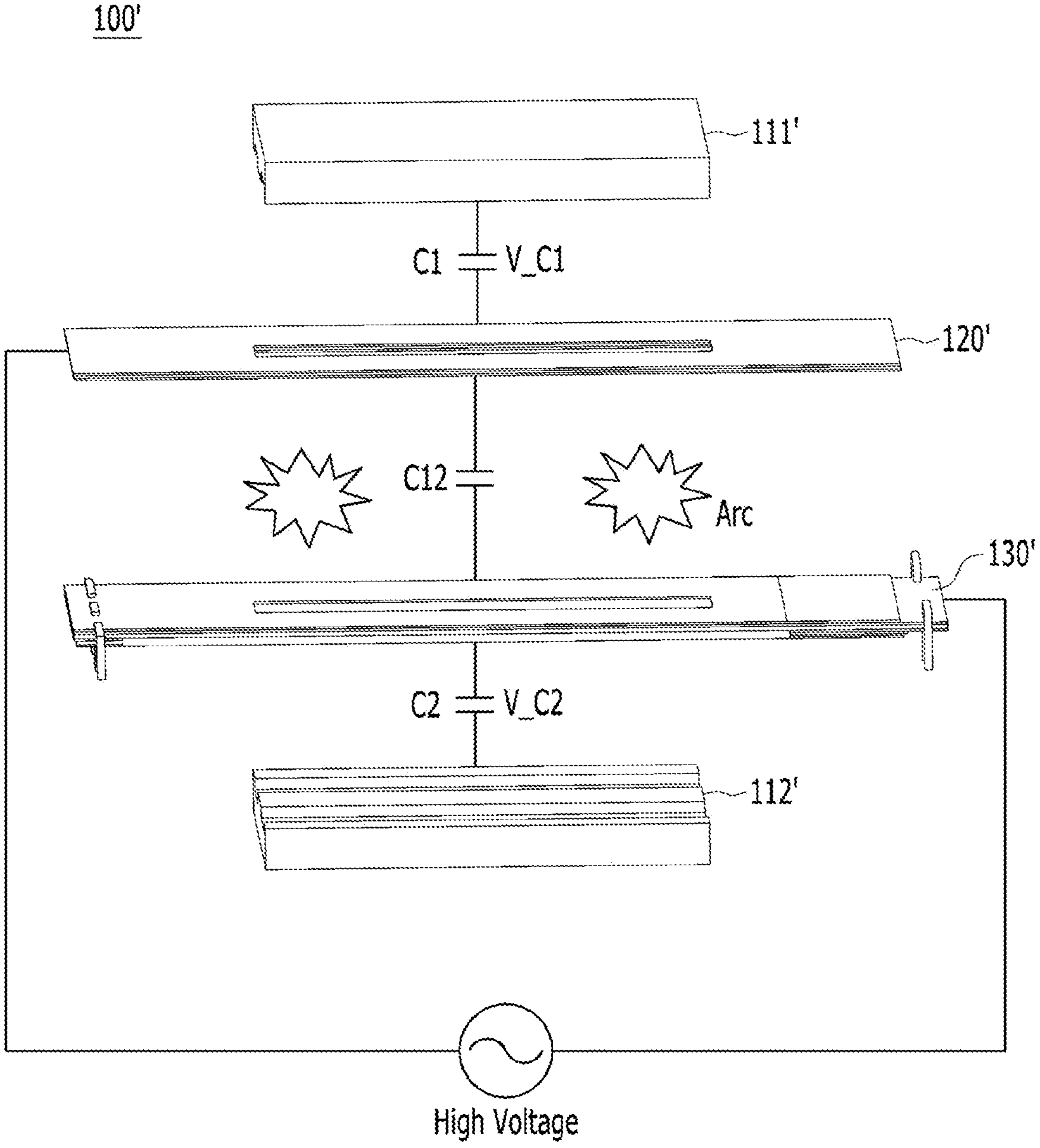
FIGS. 3A and 3B are views illustrating a discharge phenomenon of a transformer according to a comparative example.
Figure 3B:
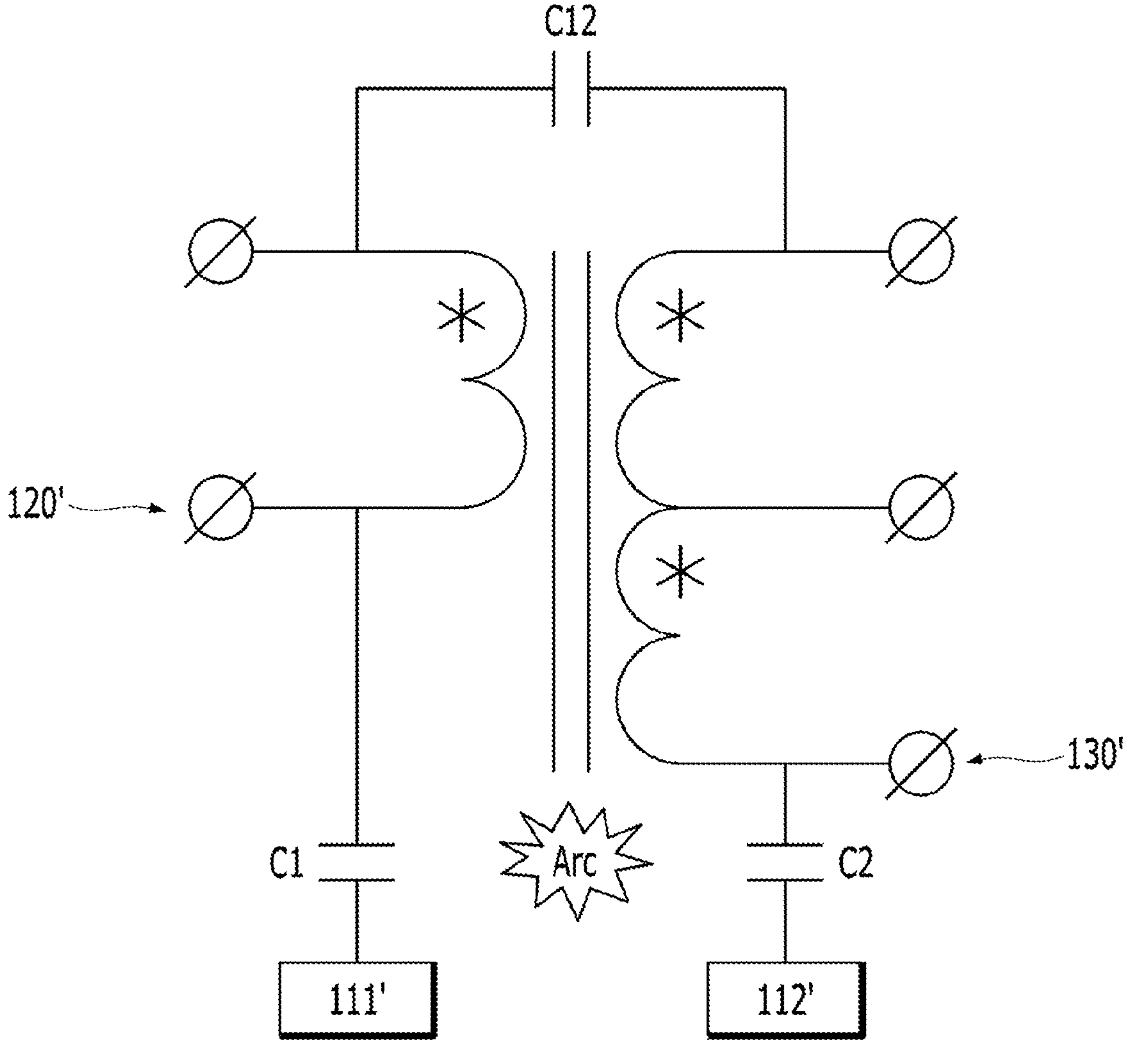
Figure 4:
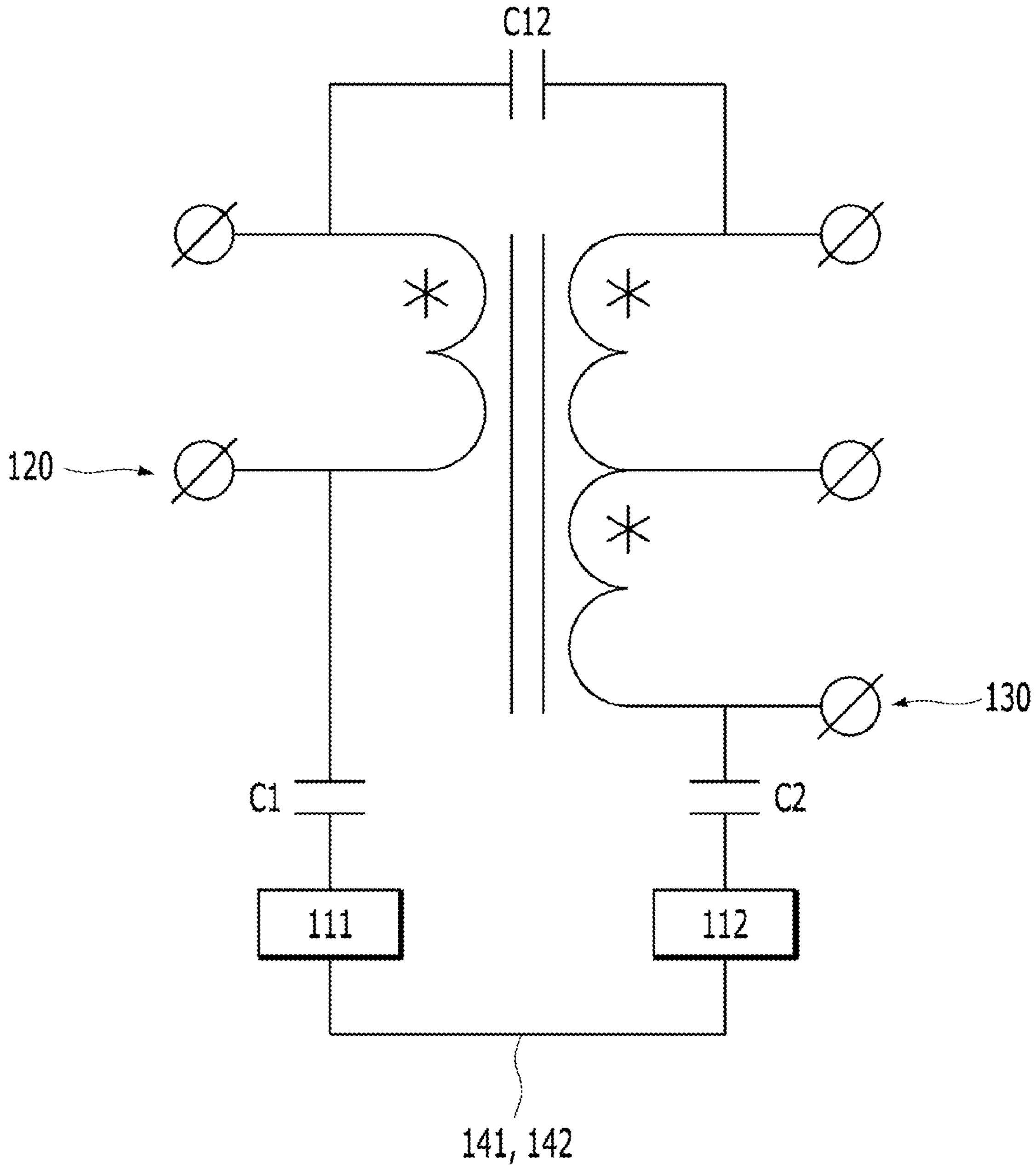
FIG. 4 is a view illustrating the effect of the transformer according to the embodiment.

FIGS. 3A and 3B are views illustrating a discharge phenomenon of the transformer according to the comparative example, and FIG. 4 is a view illustrating the effect of the transformer according to the embodiment.

In the transformer 100' according to the comparative example shown in FIG. 3A, no core connectors 141 and 142 are provided, compared to the transformer 100 according to the embodiment shown in FIGS. 1 to 2B. In addition, FIG. 3B is a circuit diagram of the transformer 100' according to the comparative example shown in FIG. 3A.

Referring to FIGS. 3A and 3B together, the physical insulation distance between a primary side coil portion 120' and a secondary side coil portion 130' in the first direction may be insufficient as a slim structure is adopted. Even in the case in which a plurality of insulating layers is disposed, therefore, a discharge phenomenon may occur due to potential difference between parasitic capacitance components C1, C2, and C12. Specifically, in the transformer 100' according to the comparative example, the parasitic capacitance component C1 exists between an upper core 111' and the primary side coil portion 120', the parasitic capacitance component C12 exists between the primary side coil portion 120' and the secondary side coil portion 130', and the parasitic capacitance component C2 exists between the secondary side coil portion 130' and a lower core 112'. At this time, it is assumed that voltage applied to the parasitic capacitance component C1 between the upper core 111' and the primary side coil portion 120' is V_C1 and voltage applied to the parasitic capacitance component C2 between the secondary side coil portion 130' and the lower core 112' is V_C2. When the transformer 100' is operated, the differential between voltage induced at the secondary side coil portion 130' and voltage applied to the primary side coil portion 120', i.e. potential difference corresponding to magnitude obtained by multiplying the voltage induced at the secondary side coil portion 130' by (the winding ratio of each coil portion−1), is generated between V_C1 and V_C2. As a result, a discharge phenomenon occurs due to great potential difference between V_C1 and V_C2.

Unlike this, in the transformer 100 according to the embodiment, as shown in FIG. 4, the upper core 111 and the lower core 112 are short-circuited to each other due to the core connectors 141 and 142, whereby no voltage difference is generated between V_C1 and V_C2 and thus a discharge phenomenon may be prevented.

As described above, in the transformer 100 according to the embodiment, a discharge phenomenon due to intrinsic insufficiency in insulation distance caused as the result of adaption of a slim structure is solved through short circuit between the upper core 111 and the lower core 112. Another embodiment proposes a method of reducing parasitic capacitance itself by grounding the core connectors 141 and 142, which short-circuit the upper core 111 and the lower core 112 to each other, in addition to prevention of a discharge phenomenon.

As previously described, the parasitic capacitance components C1, C2, and C12 are generated at the coil portions adjacent to the respective cores. When parasitic capacitance existing in the transformer increases, however, an abnormal phenomenon may occur as follows.

In the situation in which a light load condition (e.g. an image having low power consumption, specifically an image having a predominant black color, on the screen of a flat panel display device) is output, a feedback circuit configured to control output voltage of the power supply unit (PSU) is abnormally operated, whereby the output voltage may abnormally increase. That is, primary side current of the transformer has a sinusoidal waveform at the time of normal operation; however, in the situation in which the feedback circuit is abnormally operated, current distortion occurs, whereby harmonics increase, which adversely affects EMI performance. Therefore, a method capable of reducing the parasitic capacitance components is required.

In the case in which the upper core 111 and the lower core 112 are short-circuited to each other, as shown in FIG. 4, the total parasitic capacitance component Ctotal of the transformer 100 is as follows.

$$C\text{total}=C12+(C1*C2)/(C1+C2)$$

Here, C12 is a component subordinate to design of the transformer, and values of C1 and C2 may be controlled by grounding the core connectors 141 and 142. A change in the parasitic capacitance components verified through experimentation is shown in Table 1 below.

TABLE 1

| | C12 | C1 | C2 | Ctotal |
|---|---|---|---|---|
| Before grounding | 100 | 110 | 145 | 162.5 |
| After grounding | 100 | 10 | 30 | 107.5 |

A method of electrically connecting a conductive wire to at least one of the core connectors 141 and 142 so as to be connected to a grounding circuit of the power supply unit (PSU) may be used as a grounding method. However, embodiments are not limited thereto. For example, the conductive wire connected to at least one of the core connectors 141 and 142 may be connected first to a separate terminal (not shown) disposed on the board constituting the secondary side coil portion 130, and may then be connected to the grounding circuit of the power supply unit (PSU) via the terminal.

Meanwhile, in another embodiment, the core connectors may be spaced apart from the side surfaces of the core portion 110, which will be described with reference to FIG. 5.

Figure 5:
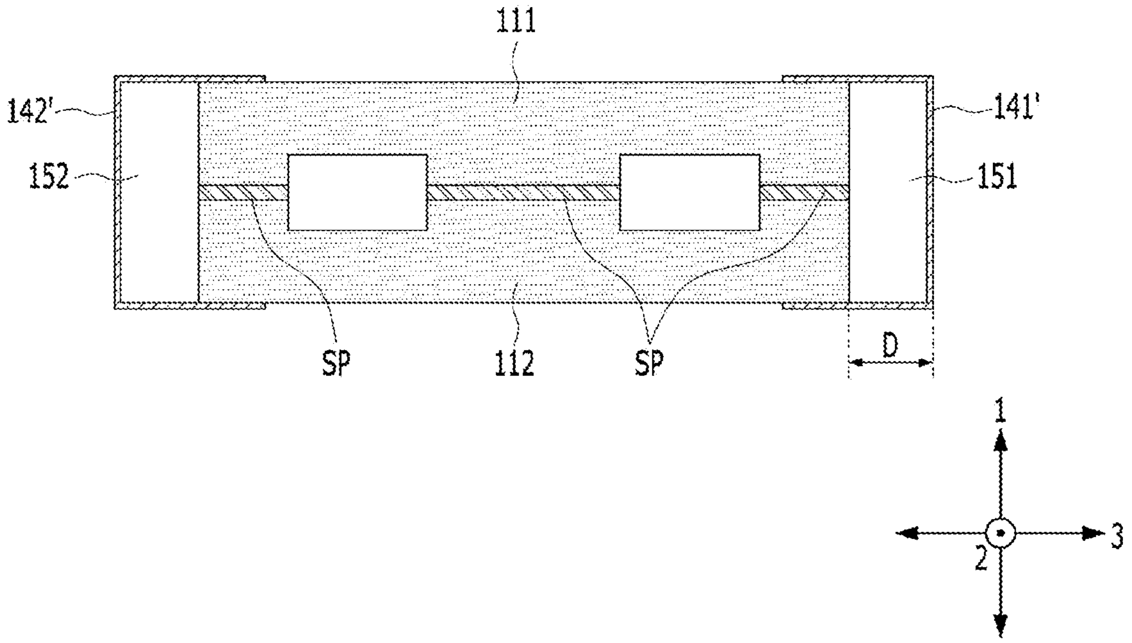
FIG. 5 is a side view of an example of the construction of a transformer according to another embodiment.

FIG. 5 is a side view of an example of the construction of a transformer according to another embodiment. For clarity, the primary side coil portion 120 and the secondary side coil portion 130 are omitted from FIG. 5.

Referring to FIG. 5, in the transformer according to the other embodiment, an upper core 111 and a lower core 112 are disposed so as to be spaced apart from each other in the first direction in the state in which spacers SP are interposed therebetween. Insulation units 151 and 152 may be disposed respectively at a third side surface and a fourth side surface of the core portion 111 and 112, which are opposite each other in the third direction (i.e. along the third axis), and core connectors 141' and 142' may each extend from the upper surface of the upper core 111 to the lower surface of the lower core 112 so as to wrap the outer edges of the insulation units 151 and 152. For example, each of the core connectors 141' and 142' may extend outwards from the upper surface of the upper core 111 in the third direction, may be bent at the outer edge of the upper surface of a corresponding one of the insulation units 151 and 152, may extend along the outer surface of the corresponding one of the insulation units 151 and 152, may be bent at the outer edge of the lower surface of the corresponding one of the insulation units 151 and 152, and may extend to the lower surface of the lower core 112 in the third direction.

Each of the insulation units 151 and 152 may include a polymer resin film, paper, or an air gap, which, however, is illustrative and thus embodiments are not limited thereto.

In the above structure, each of the core connectors 141' and 142' may be spaced apart from the side surface of the core portion by the thickness D of a corresponding one of the insulation units 151 and 152 in the third direction.

In the case in which a conductor is disposed at the side surface of the core portion, magnetic flux generated in the core portion may contact the conductor, whereby eddy current may be generated. The eddy current may cause an increase in AC resistance and a decrease in Q value of the magnetic coupling device, and may increase the amount of heat generated in the magnetic coupling device. Since the core connectors 141' and 142' are spaced apart from the core portion, however, the effect of the eddy current may be reduced. As the effect of the eddy current is reduced, the Q value is increased, the amount of heat that is generated in the magnetic coupling device is decreased, and power consumption necessary for driving another coupling device, such as a PSU, is reduced.

In addition to the effect of the eddy current, parasitic capacitance generated between the core portion and the core connectors 141' and 142' may also be reduced as the result of the core connectors 141' and 142' being spaced apart from the core portion.

The effects based on the spacing distance D between each of the core connectors 141' and 142' and the side surface of the core portion are shown in Table 2 below.

TABLE 2

| Spacing distance D (μm) | Q factor (@ 100 kHz) | Rs (Ω) | Ls (uH) | Cs (pF) |
|---|---|---|---|---|
| 0 | 86 | 1.77 | 241.5 | 107 |
| 50 | 90 | 1.69 | 241.7 | 100 |
| 300 | 98 | 1.55 | 241.6 | 99 |
| 600 | 100 | 1.52 | 241.6 | 99 |
| 900 | 105 | 1.45 | 241.6 | 99 |

Referring to Table 2, it can be seen that, as the spacing distance D increases, the Q value increases and resistance Rs and capacitance Cs decrease.

The magnetic coupling device described above may include a filter or a transformer, and may have signal coupling, filtering, and voltage and/or power conversion functions. Since the magnetic coupling device is capable of reducing parasitic capacitance and preventing a discharge phenomenon while being slimmed, it is possible to satisfy demands for slim electronic products. For example, in the case in which the magnetic coupling device is applied to mobile devices, electric home appliances, such as TVs, or vehicle parts, it is possible to reduce the thickness of parts, whereby it is possible to secure characteristics of light and thin products.

As is apparent from the above description, in a magnetic coupling device according to embodiments and a flat panel display device including the same, the difference between parasitic voltage between one core and a primary coil and parasitic capacitance between the other core and a secondary coil is solved by the provision of a core connector configured to short-circuit one core and the other core constituting a core portion to each other. Consequently, it is possible to solve fluctuation of an operating frequency of a circuit using the magnetic coupling device.

In addition, it is possible to prevent a discharge phenomenon due to voltage difference between the cores, which may occur when it is necessary to secure the spacing distance between the cores in order to reduce inductance or to perform heat dissipation, or a discharge phenomenon due to adjacent disposition of the primary coil and the secondary coil for slimming.

It should be noted that the effects of embodiments are not limited to the effects mentioned above, and other unmentioned effects will be clearly understood by those skilled in the art from the above description.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A magnetic coupling device comprising:

a first core and a second core spaced apart from each other in a first direction by a gap that is more than 100 μm and is less than 200 μm, wherein the first core includes a first core upper surface, a first core lower surface opposite to the first core upper surface, and a plurality of first core side surfaces disposed between the first core upper surface and the first core lower surface, wherein the second core includes a second core upper surface, a second core lower surface opposite to the second core upper surface, and a plurality of second core side surfaces disposed between the second core upper surface and the second core lower surface, wherein an edge of the first core side surface contacts an edge of the first core upper surface, and an edge of the second core side surface contacts an edge of the second core lower surface;

a first coil and a second coil disposed between the first core and the second core, and the second coil being spaced apart from the first coil in the first direction; and a core connector to electrically connect to the first core and the second core, wherein a spacing distance between the first coil and the second coil in the first direction is 0.025 or less times of a sum of a thickness of the first core in the first direction and a thickness of the second core in the first direction, wherein the core connector only contacts the first core side surface of the first core and only contacts the second core side surface of the second core, and the core connector extends from the first core side surface of the first core to the second core side surface of the second core, and wherein the core connector does not extend to the first core upper surface of the first core and does not extend to the second core lower surface of the second core, wherein the first core lower surface of the first core includes a plurality of first recesses formed in a concave manner toward the first core upper surface of the first core, wherein the plurality of first core side surfaces includes a 1-1 side surface and a 1-2 side surface being opposite to the 1-1 side surface, wherein each of the plurality of first recesses extends from the 1-1 side surface to the 1.2 side surface, wherein the second core upper surface of the second core includes a plurality of second recesses formed in a concave manner toward the second core lower surface of the second core, wherein the plurality of second core side surfaces includes a 2-1 side surface and a 2-2 side surface being opposite to the 2-1 side surface, wherein each of the plurality of second recesses extends from the 2-1 side surface to the 2-2 side surface, wherein the plurality of first core side surfaces includes a 1-3 side surface and a 1.4 side surface opposite to the 1-3 side surface, the 1-3 side surface being perpendicular to the 1-1 side surface and the 1-3 side surface being perpendicular to the 1-2 side surface, the 1-4 side surface being perpendicular to the 1-1 side surface and the 1-4 side surface being perpendicular to the 1-2 side surface, wherein the plurality of second core side surfaces includes a 2-3 side surface and a 2-4 side surface opposite to the 2-3 side surface, the 2-3 side surface being perpendicular to the 2-1 side surface and the 2-3 side surface being perpendicular to the 2-2 side surface, the 2-4 side surface being perpendicular to the 2-1 side surface and the 2-4 side surface being perpendicular to the 2-2 side surface, wherein the 1-3 side surface is oriented in a same direction as the 2-3 side surface and where the core connector extends from the 1-3 side surface of the first core to the 2-3 side surface of the second core, wherein an area of the core connector is ¼ to ½ times of a sum of an area of the 1-3 side surface of the first core and an area of the 2-3 side surface of the second core.

2. The magnetic coupling device according to claim 1, wherein the first core comprises a plurality of first protrusions protruding in the first direction, and wherein the second core comprises a plurality of second protrusions protruding in the first direction.

3. The magnetic coupling device according to claim 2, wherein the plurality of first protrusions are opposite to the plurality of second protrusions.

4. The magnetic coupling device according to claim 3, wherein each of the plurality of first protrusions extends in a second direction, the second direction being perpendicular to the first direction, and wherein each of the plurality of second protrusions extends in the second direction.

5. The magnetic coupling device according to claim 4, wherein the plurality of first protrusions comprises two first outer legs spaced apart from each other in a third direction, and a first central leg disposed between the two first outer legs, and wherein the plurality of second protrusions comprises two second outer legs spaced apart from each other in the third direction, and a second central leg disposed between the two second outer legs, wherein the third direction is perpendicular to the first direction, and the third direction is perpendicular to the second direction.

6. The magnetic coupling device according to claim 5, wherein a width of each of the first outer legs in the third direction is less than a width of the first central leg in the third direction.

7. The magnetic coupling device according to claim 1, wherein the spacing distance between the first coil and the second coil in the first direction is 0.004 or more times of the sum of the thickness of the first core in the first direction and the thickness of the second core in the first direction.

8. The magnetic coupling device according to claim 7, wherein the first coil is disposed inward from the 1.3 side surface and the 1-4 side surface of the first core, and the first coil is to extend outward from the 1-1 side surface and the 1-2 side surface of the first core, and wherein the second coil is disposed inward from the 2-3 side surface and the 2-4 side surface of the second core, and the second coil is to extend outward from the 2-1 side surface and the 2-2 side surface of the second core.

9. The magnetic coupling device according to claim 8, wherein the core connector extends from the 1-3 side surface of the first core to the 2-3 side surface of the second core.

10. The magnetic coupling device according to claim 1, wherein the core connector comprises copper (Cu), wherein the first coil comprises a conductive wire wound a plurality of time in a planar spiral form in a circumferential direction, and wherein the second coil comprises a printed circuit board.

11. The magnetic coupling device according to claim 1, wherein a height of the core connector in the first direction is lower than a sum of thickness of the first core and the second core.

12. The magnetic coupling device according to claim 1, wherein the core connector is grounded.

13. A magnetic coupling device comprising:

a first core and a second core spaced apart from each other in a first direction by a cap that is more than 100 μm and less than 200 μm, wherein the first core includes a first core upper surface, a first core lower surface opposite to the first core upper surface, and a plurality of first core side surfaces disposed between the first core upper surface and the first core lower surface, wherein the second core includes a second core upper surface, a second core lower surface opposite to the second core upper surface, and a plurality of second core side surfaces disposed between the second core upper surface and the second core lower surface, wherein an edge of the first core side surface contacts an edge of the first core upper surface, and an edge of the second core side surface contacts an edge of the second core lower surface;

a first coil and a second coil disposed between the first core and the second core, and the second coil being spaced apart from the first coil in the first direction;

an insulating member disposed between the first coil and the second coil; and a core connector to electrically connect to the first core and the second core, wherein a thickness of the insulating member in the first direction is 0.004 to 0.025 times of a sum of a thickness of the first core in the first direction and a thickness of the second core in the first direction, wherein the core connector only contacts the first core side surface of the first core and only contacts the second core side surface of the second core, and the core connector extends from the first core side surface of the first core to the second core side surface of the second core; and wherein the core connector does not extend to the first core upper surface of the first core and does not extend to the second core lower surface of the second core, wherein the first core lower surface of the first core includes a plurality of first recesses formed in a concave manner toward the first core upper surface of the first core, wherein the plurality of first core side surfaces includes a 1-1 side surface and a 1-2 side surface being opposite to the 1-1 side surface, wherein each of the plurality of first recesses extends from the 1-1 side surface to the 1-2 side surface, wherein the second core upper surface of the second core includes a plurality of second recesses formed in a concave manner toward the second core lower surface of the second core, wherein the plurality of second core side surfaces includes a 2-1 side surface and a 2-2 side surface being opposite to the 2-1 side surface, wherein each of the plurality of second recesses extends from the 2-1 side surface to the 2-2 side surface, wherein the plurality of first core side surfaces includes a 1-3 side surface and a 1-4 side surface opposite to the 1-3 side surface, the 1-3 side surface being perpendicular to the 1-1 side surface and the 1-3 side surface being perpendicular to the 1-2 side surface, the 1-4 side surface being perpendicular to the 1-1 side surface and the 1-4 side surface being perpendicular to the 1-2 side surface, wherein the plurality of second core side surfaces includes a 2-3 side surface and a 2-4 side surface opposite to the 2-3 side surface, the 2-3 side surface being perpendicular to the 2-1 side surface and the 2-3 side surface being perpendicular to the 2-2 side surface, the 2-4 side surface being perpendicular to the 2-1 side surface and the 2-4 side surface being perpendicular to the 2-2 side surface, wherein the 1-3 side surface is oriented in a same direction as the 2-3 side surface, and wherein the core connector extends from the 1-3 side surface of the first core to the 2-3 side surface of the second core, wherein an area of the core connector is ¼ to ½ times of a sum of an area of the 1-3 side surface of the first core and an area of the 2-3 side surface of the second core.

14. The magnetic coupling device according to claim 13, wherein the insulating member comprises a first insulating layer, and a second insulating layer, wherein the first insulating layer is disposed on a lower surface of the first coil such that the first insulating layer is between the first coil and the second insulating layer, wherein the second insulating layer is disposed on an upper surface of the second coil such that the second insulating layer is between the first insulating layer and the second coil.

15. The magnetic coupling device according to claim 13, wherein the first core lower surface comprises a 1-1 lower surface, a 1-2 lower surface, and a 1-3 lower surface divided by the plurality of first recesses, the 1-3 lower surface being located between the 1-1 lower surface and the 1-2 lower surface, wherein lengths of the 1-1 lower surface, the 1-2 lower surface, and the 1-3 lower surface in a second direction from the 1-1 side surface to the 1-2 side surface are equal to each other, the second direction is perpendicular to the first direction, and wherein a width of the 1-3 lower surface in a third direction from the 1-1 lower surface to the 1-2 lower surface is greater than a width of the 1-1 lower surface in the third direction, the third direction is perpendicular to the first direction, and the third direction is perpendicular to the second direction.

16. The magnetic coupling device according to claim 13, wherein a height of the core connector in the first direction is lower than a sum of thickness of the first core and the second core.

17. The magnetic coupling device according to claim 13, wherein the core connector is grounded.

* * * * *